US011922736B2

(12) United States Patent
Koga et al.

(10) Patent No.: US 11,922,736 B2
(45) Date of Patent: Mar. 5, 2024

(54) SYSTEMS AND METHODS FOR AUTOMATIC SYSTEM CHECKS

(71) Applicant: OSHKOSH CORPORATION, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 243 days.

(21) Appl. No.: 17/232,682

(22) Filed: Apr. 16, 2021

(65) Prior Publication Data

US 2021/0327164 A1 Oct. 21, 2021

Related U.S. Application Data

(60) Provisional application No. 63/011,625, filed on Apr. 17, 2020.

(51) Int. Cl.
*G07C 5/00* (2006.01)
*G07C 5/08* (2006.01)
*B65F 3/00* (2006.01)

(52) U.S. Cl.
CPC ............ *G07C 5/008* (2013.01); *G07C 5/006* (2013.01); *G07C 5/0816* (2013.01); *B65F 3/00* (2013.01)

(58) Field of Classification Search
CPC ...... G07C 5/008; G07C 5/006; G07C 5/0816; B65F 3/00
USPC .......................................................... 701/31.4
See application file for complete search history.

(56) References Cited

U.S. PATENT DOCUMENTS 5,378,010 A 1/1995 Marino et al.
5,555,171 A * 9/1996 Sonehara ............ G07C 5/0808 702/183
5,919,027 A 7/1999 Christenson
5,934,858 A 8/1999 Christenson
5,934,867 A 8/1999 Christenson
5,938,394 A 8/1999 Christenson
5,951,235 A 9/1999 Young et al.
5,967,731 A 10/1999 Brandt (Continued)

*Primary Examiner* — Phutthiwat Wongwian
*Assistant Examiner* — John D Bailey
(74) *Attorney, Agent, or Firm* — Foley & Lardner LLP

(57) ABSTRACT

A refuse vehicle includes multiple systems, each system including a sensor. The refuse vehicle also includes an automated check system. The automated check system includes processing circuitry configured to obtain sensor data from the sensor of each of the multiple systems, determine which of the multiple systems require manual inspection based on the sensor data, and operate a display screen to prompt a technician to manually inspect one or more of the multiple systems.

20 Claims, 4 Drawing Sheets

(56) References Cited

U.S. PATENT DOCUMENTS

| | | | | |
|---|---|---|---|---|
| 5,971,694 | A | 10/1999 | McNeilus et al. | |
| 5,984,609 | A | 11/1999 | Bartlett | |
| 6,033,176 | A | 3/2000 | Bartlett | |
| 6,062,803 | A | 5/2000 | Christenson | |
| 6,089,813 | A | 7/2000 | McNeilus et al. | |
| 6,105,984 | A | 8/2000 | Schmitz et al. | |
| 6,120,235 | A | 9/2000 | Humphries et al. | |
| 6,123,500 | A | 9/2000 | McNeilus et al. | |
| 6,210,094 | B1 | 4/2001 | McNeilus et al. | |
| 6,213,706 | B1 | 4/2001 | Christenson | |
| 6,224,318 | B1 | 5/2001 | McNeilus et al. | |
| 6,315,515 | B1 | 11/2001 | Young et al. | |
| 6,336,783 | B1 | 1/2002 | Young et al. | |
| 6,350,098 | B1 | 2/2002 | Christenson et al. | |
| 6,390,758 | B1 | 5/2002 | McNeilus et al. | |
| 6,447,239 | B2 | 9/2002 | Young et al. | |
| 6,474,928 | B1 | 11/2002 | Christenson | |
| 6,516,914 | B1 | 2/2003 | Andersen et al. | |
| 6,553,290 | B1 * | 4/2003 | Pillar | G01M 17/00 701/34.3 |
| 6,565,305 | B2 | 5/2003 | Schrafel | |
| 6,650,977 | B2 * | 11/2003 | Miller | B60R 16/0234 701/32.7 |
| 6,757,597 | B2 | 6/2004 | Yakes et al. | |
| 6,885,920 | B2 | 4/2005 | Yakes et al. | |
| 7,070,382 | B2 | 7/2006 | Pruteanu et al. | |
| 7,164,977 | B2 | 1/2007 | Yakes et al. | |
| 7,277,782 | B2 | 10/2007 | Yakes et al. | |
| 7,284,943 | B2 | 10/2007 | Pruteanu et al. | |
| 7,302,320 | B2 | 11/2007 | Nasr et al. | |
| 7,357,203 | B2 | 4/2008 | Morrow et al. | |
| 7,363,127 | B2 * | 4/2008 | Fogelstrom | B60T 17/02 60/611 |
| 7,379,797 | B2 | 5/2008 | Nasr et al. | |
| 7,448,460 | B2 | 11/2008 | Morrow et al. | |
| 7,520,354 | B2 | 4/2009 | Morrow et al. | |
| 7,556,468 | B2 | 7/2009 | Grata | |
| 7,559,735 | B2 | 7/2009 | Pruteanu et al. | |
| 7,689,332 | B2 | 3/2010 | Yakes et al. | |
| 7,711,460 | B2 | 5/2010 | Yakes et al. | |
| 7,848,857 | B2 | 12/2010 | Nasr et al. | |
| 7,878,750 | B2 | 2/2011 | Zhou et al. | |
| 7,931,103 | B2 | 4/2011 | Morrow et al. | |
| 8,000,850 | B2 | 8/2011 | Nasr et al. | |
| 8,139,109 | B2 | 3/2012 | Schmiedel et al. | |
| 8,182,194 | B2 | 5/2012 | Pruteanu et al. | |
| 8,215,892 | B2 | 7/2012 | Calliari | |
| 8,360,706 | B2 | 1/2013 | Addleman et al. | |
| 8,540,475 | B2 | 9/2013 | Kuriakose et al. | |
| 8,561,735 | B2 | 10/2013 | Morrow et al. | |
| 8,807,613 | B2 | 8/2014 | Howell et al. | |
| 8,947,531 | B2 | 2/2015 | Fischer et al. | |
| 9,045,014 | B1 * | 6/2015 | Verhoff | F41H 5/16 |
| 9,174,686 | B1 | 11/2015 | Messina et al. | |
| 9,216,856 | B2 | 12/2015 | Howell et al. | |
| 9,305,407 | B1 * | 4/2016 | Walton | G07C 5/0841 |
| 9,387,985 | B2 | 7/2016 | Gillmore et al. | |
| 9,420,203 | B2 | 8/2016 | Broggi et al. | |
| 9,656,640 | B1 | 5/2017 | Verhoff et al. | |
| 9,707,869 | B1 | 7/2017 | Messina et al. | |
| 9,880,581 | B2 | 1/2018 | Kuriakose et al. | |
| 9,981,803 | B2 | 5/2018 | Davis et al. | |
| 10,144,389 | B2 * | 12/2018 | Archer | B60R 25/08 |
| 10,196,205 | B2 | 2/2019 | Betz et al. | |
| D843,281 | S | 3/2019 | Gander et al. | |
| 10,414,067 | B2 | 9/2019 | Datema et al. | |
| 10,434,995 | B2 | 10/2019 | Verhoff et al. | |
| 10,457,533 | B2 | 10/2019 | Puszkiewicz et al. | |
| D871,283 | S | 12/2019 | Gander et al. | |
| 10,558,234 | B2 | 2/2020 | Kuriakose et al. | |
| 10,594,991 | B1 * | 3/2020 | Skolnick | H04N 7/188 |
| D888,629 | S | 6/2020 | Gander et al. | |
| 10,781,090 | B2 | 9/2020 | Puszkiewicz et al. | |
| 10,800,605 | B2 | 10/2020 | Rocholl et al. | |
| 10,843,379 | B2 | 11/2020 | Rocholl et al. | |
| 10,858,184 | B2 | 12/2020 | Betz et al. | |
| 10,859,167 | B2 | 12/2020 | Jax et al. | |
| D907,544 | S | 1/2021 | Wall et al. | |
| 10,899,538 | B2 | 1/2021 | Nelson et al. | |
| D909,934 | S | 2/2021 | Gander et al. | |
| 10,987,829 | B2 | 4/2021 | Datema et al. | |
| 10,997,802 | B2 | 5/2021 | Koga et al. | |
| 11,001,135 | B2 | 5/2021 | Yakes et al. | |
| 11,001,440 | B2 | 5/2021 | Rocholl et al. | |
| 11,007,863 | B2 | 5/2021 | Yakes et al. | |
| 2003/0158635 | A1 * | 8/2003 | Pillar | B60L 50/15 701/1 |
| 2003/0158638 | A1 * | 8/2003 | Yakes | G07C 5/008 180/65.245 |
| 2004/0002794 | A1 * | 1/2004 | Pillar | B65F 3/045 701/1 |
| 2004/0024502 | A1 * | 2/2004 | Squires | B60L 3/12 701/2 |
| 2005/0273227 | A1 * | 12/2005 | Fogelstrom | B60T 17/22 701/1 |
| 2017/0116792 | A1 * | 4/2017 | Jelinek | G06Q 10/20 |
| 2017/0270720 | A1 * | 9/2017 | Aydin | G05D 23/00 |
| 2018/0293891 | A1 * | 10/2018 | Troutman | G08G 1/13 |
| 2019/0080528 | A1 * | 3/2019 | Bednar | G07C 5/006 |
| 2019/0185077 | A1 | 6/2019 | Smith et al. | |
| 2019/0344475 | A1 | 11/2019 | Datema et al. | |
| 2019/0351883 | A1 | 11/2019 | Verhoff et al. | |
| 2019/0385385 | A1 * | 12/2019 | Davidson | G07C 5/0808 |
| 2019/0385386 | A1 * | 12/2019 | Davidson | G07C 5/0858 |
| 2020/0262328 | A1 | 8/2020 | Nelson et al. | |
| 2020/0262366 | A1 | 8/2020 | Wildgrube et al. | |
| 2020/0265656 | A1 * | 8/2020 | Koga | G05D 1/0016 |
| 2020/0316816 | A1 | 10/2020 | Messina et al. | |
| 2020/0317083 | A1 | 10/2020 | Messina et al. | |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346657 | A1 | 11/2020 | Clifton et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0348681 | A1 | 11/2020 | Clifton et al. | |
| 2020/0348764 | A1 | 11/2020 | Clifton et al. | |
| 2020/0398670 | A1 | 12/2020 | Rocholl et al. | |
| 2020/0398695 | A1 | 12/2020 | Rocholl et al. | |
| 2020/0398697 | A1 | 12/2020 | Rocholl et al. | |
| 2020/0398772 | A1 | 12/2020 | Wildgrube et al. | |
| 2020/0398857 | A1 | 12/2020 | Clifton et al. | |
| 2020/0399058 | A1 | 12/2020 | Rocholl et al. | |
| 2021/0031649 | A1 | 2/2021 | Messina et al. | |
| 2021/0054942 | A1 | 2/2021 | Jax et al. | |
| 2021/0069934 | A1 | 3/2021 | Rocholl et al. | |
| 2021/0086991 | A1 | 3/2021 | Betz et al. | |
| 2021/0139237 | A1 | 5/2021 | Nelson et al. | |

* cited by examiner

SYSTEMS AND METHODS FOR AUTOMATIC SYSTEM CHECKS

CROSS-REFERENCE TO RELATED PATENT APPLICATION

This application claims the benefit of and priority to U.S. Provisional Application No. 63/011,625, filed Apr. 17, 2020, the entire disclosure of which is incorporated by reference herein.

BACKGROUND

The present disclosure relates to refuse vehicles. More particularly, the present disclosure relates to automated systems for refuse vehicles.

SUMMARY

One embodiment of the present disclosure relates to a refuse vehicle. The refuse vehicle includes multiple systems, each system including a sensor. The refuse vehicle also includes an automated check system. The automated check system includes processing circuitry configured to obtain sensor data from the sensor of each of the multiple systems, determine which of the multiple systems require manual inspection based on the sensor data, and operate a display screen to prompt a technician to manually inspect one or more of the multiple systems.

Another embodiment of the present disclosure relates to a check system for a refuse vehicle. The check system includes processing circuitry configured to obtain sensor data from a sensor of each of multiple systems of the refuse vehicle. The processing circuitry is also configured to determine which of the multiple systems require manual inspection based on the sensor data. The processing circuitry is also configured to operate a display screen to prompt a technician to manually inspect one or more of the plurality of systems.

Another embodiment of the present disclosure relates to a method for determining if a refuse vehicle is ready for deployment. The method includes obtaining sensor data from a sensor of each of multiple systems of the refuse vehicle. The method also includes determining which of the multiple systems require manual inspection based on the sensor data. The method also includes prompting a technician to manually inspect one or more of the multiple systems that are determined to require manual inspection.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a refuse vehicle (e.g., a commercial vehicle, a fire fighting vehicle, etc.) can include various systems (e.g., loading systems, compaction systems, drive systems, steering systems, etc.) and an automated check system. The automated check system can include a controller that is configured to obtain sensor data from the various systems. The controller may compare the sensor data to corresponding acceptable ranges or desired values to determine if each of the systems are operating properly or if any of the systems require manual inspection. The controller can also operate a display screen (e.g., a display screen of the refuse vehicle) to display which of the systems are identified to require manual inspection.

The sensors used by the controller of the automated check system may be pre-existing sensors or may be installed specifically for the automated check system. The sensors facilitate automatic performance of morning systems checks or system checks before the refuse vehicle performs its route. The controller can check all critical systems of the refuse vehicle, including but not limited to, air pressure, fluid levels, tire pressure, coolant levels, etc. Systems that are determined to be operating normally or within required levels may be displayed on the display screen as green (e.g., in a list or in a graphical user interface).

A system that is identified by the controller as being out of specification may be displayed on the display screen as such (e.g., in a red or yellow color, with a notification, etc.). A technician may view the display screen and perform a manual inspection of systems that may be out of specification. The technician can provide a user input indicating that a final inspection has been completed or that the systems has been put into a correct state (e.g., maintenance has been performed). Upon completion of the manual check or inspection, the technician or operator may provide a user input to the controller to re-perform the automatic check to identify if the system is operating properly.

After the automated check system has performed all systems checks and any corrections are made (e.g., by a technician), the controller may generate a complete log of actions taken, systems checked, etc. The controller can provide the log to a system database for access.

Refuse Vehicle

Figure 1:
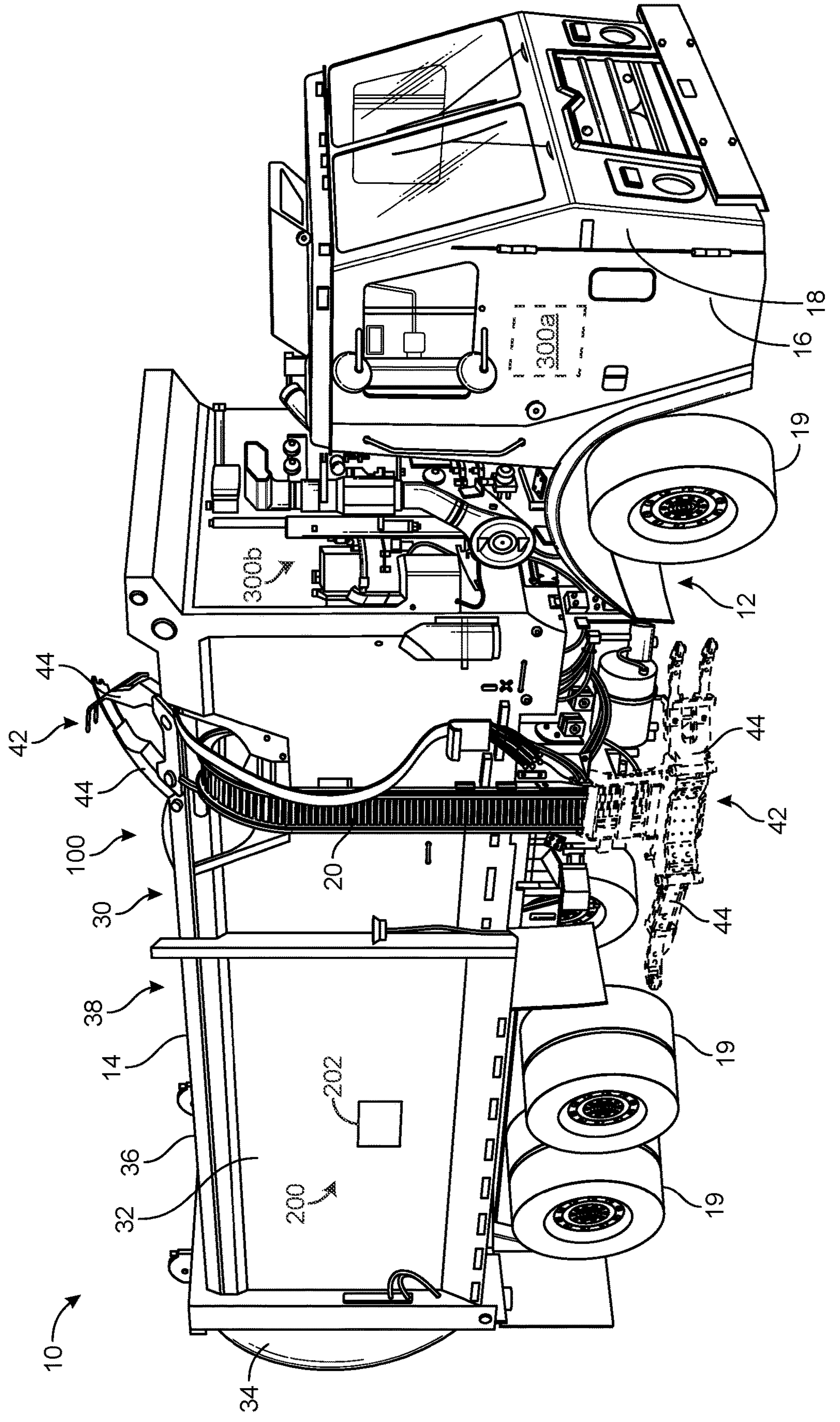
FIG. 1 is perspective view of a refuse vehicle including an automated check system, according to an exemplary embodiment.

According to the exemplary embodiment shown in FIG. 1, a vehicle, shown as refuse vehicle 10 (e.g., a garbage truck, a waste collection truck, a sanitation truck, a refuse collection truck, a refuse collection vehicle, etc.), is configured as a side-loading refuse truck having a first lift mechanism/system (e.g., a side-loading lift assembly, etc.), shown as lift assembly 100. In other embodiments, refuse vehicle 10 is configured as a front-loading refuse truck or a rear-loading refuse truck. In still other embodiments, the vehicle is another type of vehicle (e.g., a skid-loader, a telehandler, a plow truck, a boom lift, etc.).

As shown in FIG. 1, refuse vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of refuse vehicle 10 by an operator (e.g., a seat, a steering wheel, hydraulic controls, a user interface, switches, buttons, dials, etc.). As shown in FIG. 1, refuse vehicle 10 includes a prime mover, shown as engine 18, coupled to frame 12 at a position beneath cab 16. Engine 18 is configured to provide power to a plurality of tractive elements, shown as wheels 19, and/or to other systems of refuse vehicle 10 (e.g., a pneumatic system, a hydraulic system, an electric system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of refuse vehicle 10.

According to an exemplary embodiment, refuse vehicle 10 is configured to transport refuse from various waste receptacles within a municipality to a storage and/or processing facility (e.g., a landfill, an incineration facility, a recycling facility, etc.). As shown in FIG. 1, body 14 includes a plurality of panels, shown as panels 32, a tailgate 34, and a cover 36. Panels 32, tailgate 34, and cover 36 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. According to the embodiment shown in FIG. 1, body 14 and refuse compartment 30 are positioned behind cab 16. In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1, refuse vehicle 10 includes first lift mechanism/system (e.g., a front-loading lift assembly, etc.), shown as lift assembly 100. Lift assembly 100 includes a grabber assembly, a carrier assembly, etc., shown as grabber assembly 42, movably coupled to a track, shown as track 20, and configured to move along an entire length of track 20. According to the exemplary embodiment shown in FIG. 1, track 20 extends along substantially an entire height of body 14 and is configured to cause grabber assembly 42 to tilt near an upper height of body 14. In other embodiments, track 20 extends along substantially an entire height of body 14 on a rear side of body 14. Refuse vehicle 10 can also include a reach system or assembly coupled with a body or frame of refuse vehicle 10 and lift assembly 100. The reach system can include telescoping members, a scissors stack, etc., or any other configuration that can extend or retract to provide additional reach of grabber assembly 42 for refuse collection.

Figure 3:
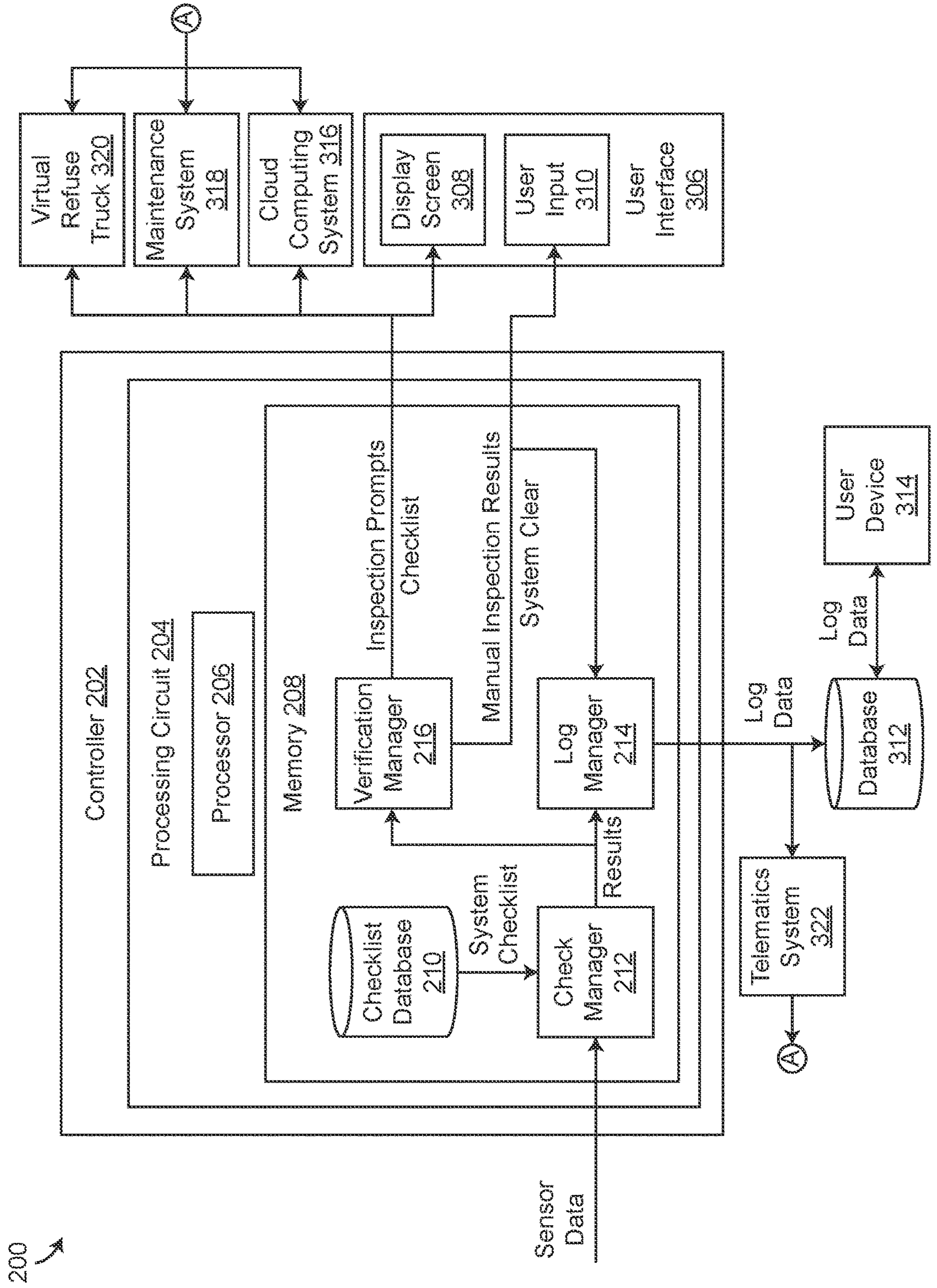
FIG. 3 is a block diagram of the controller of FIG. 2, showing the controller in greater detail, according to an exemplary embodiment.

Referring still to FIG. 1, grabber assembly 42 includes a pair of grabber arms shown as grabber arms 44. Grabber arms 44 are configured to rotate about an axis extending through a bushing. Grabber arms 44 are configured to releasably secure a refuse container to grabber assembly 42, according to an exemplary embodiment. Grabber arms 44 rotate about the axis extending through the bushing to transition between an engaged state (e.g., a fully grasped configuration, a fully grasped state, a partially grasped configuration, a partially grasped state) and a disengaged state (e.g., a fully open state/configuration, a fully released state/configuration, a partially open state/configuration, a partially released state/configuration). In the engaged state, grabber arms 44 are rotated towards each other such that the refuse container is grasped therebetween. In the disengaged state, grabber arms 44 rotate outwards (as shown in FIG. 3) such that the refuse container is not grasped therebetween. By transitioning between the engaged state and the disengaged state, grabber assembly 42 releasably couples the refuse container with grabber assembly 42. Refuse vehicle 10 may pull up along-side the refuse container, such that the refuse container is positioned to be grasped by the grabber assembly 42 therebetween. Grabber assembly 42 may then transition into an engaged state to grasp the refuse container. After the refuse container has been securely grasped, grabber assembly 42 may be transported along track 20 with the refuse container. When grabber assembly 42 reaches the end of track 20, grabber assembly 42 may tilt and empty the contents of the refuse container in refuse compartment 30. The tilting is facilitated by the path of track 20. When the contents of the refuse container have been emptied into refuse compartment 30, grabber assembly 42 may descend along track 20, and return the refuse container to the ground. Once the refuse container has been placed on the ground, the grabber assembly may transition into the disengaged state, releasing the refuse container.

Automated Checks System

Referring still to FIG. 1, refuse vehicle 10 includes an automated check system 200 and various systems 300. Automated check system 200 includes a controller 202 that is configured to communicate with various systems, sensors, apparatuses, etc., of refuse vehicle 10. In some embodiments, controller 202 is communicably coupled with various sensors, systems, actuators, electric motors, etc., and is configured to obtain input data from the communicably coupled devices to determine if refuse vehicle 10 is ready for deployment along a route. In some embodiments, automated check system 200 is configured to perform its functionality at a start-up of refuse vehicle 10 or in response to receiving a request to perform its functionality to determine if refuse vehicle 10 is ready for deployment. Other systems require a technician to manually inspect various systems, sub-systems, etc., of refuse vehicle 10 to determine if refuse vehicle 10 is ready for deployment. Automated check system 200 obtains sensor data and can automatically determine if refuse vehicle 10 is ready for deployment or if various systems, sub-systems, etc., require manual inspection, repair, etc.

The various systems 300 can be or include engine systems, transmission systems, grabber apparatuses, loading systems, compaction systems, an air system, a tire pressure system, a pneumatic system, a fluid system, an electrical system, etc., or various sub-systems, sensors, actuators, devices, etc., thereof. The input or sensor data obtained from the various systems 300 can include air pressure, fluid levels, tire pressure, coolant levels, etc. In some embodiments, controller 202 is configured to compare values of the input or the sensor data obtained from the various systems 300 to corresponding values (e.g., specification values) or ranges of values (e.g., specification ranges) to determine if the systems 300 are operating properly. If controller 202 determines that the systems 300 are operating properly, controller 202 may determine that refuse vehicle 10 can be deployed on its route. If controller 202 determines that one or more of the systems 300 are not operating properly, based on the comparison between the input data and the corresponding values or ranges of values, controller 202 may provide a notification to an operator or technician to prompt the technician to manually inspect particular systems 300.

Figure 2:
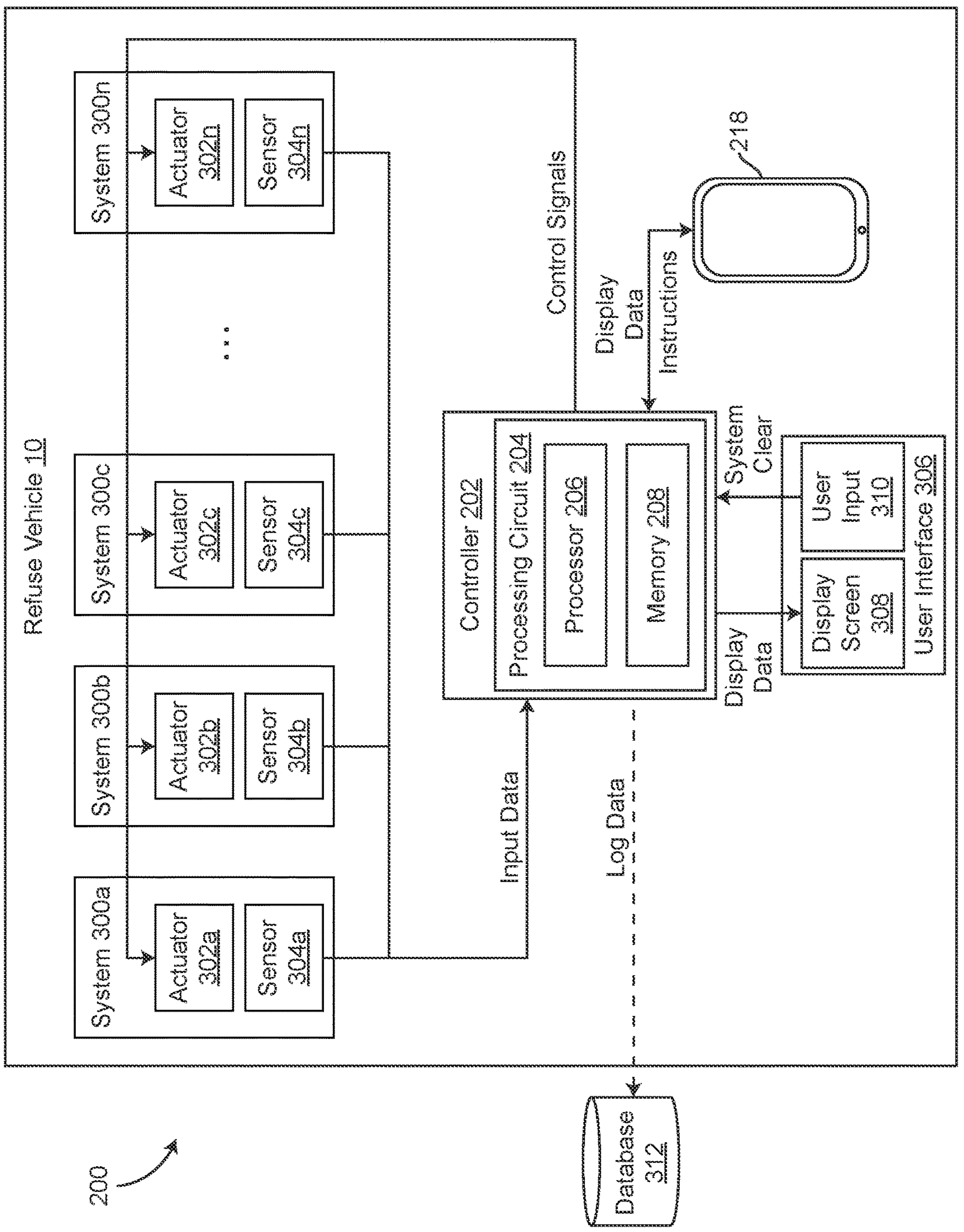
FIG. 2 is a block diagram of the automated check system of FIG. 1 including a controller, according to an exemplary embodiment.

Referring particularly to FIG. 2, automated check system 200 is shown in greater detail, according to an exemplary embodiment. Automated check system 200 includes controller 202, a database 312, a user interface 306, a personal computer device 218 (e.g., a tablet, a smartphone, etc.) and n number of systems 300. For example, refuse vehicle 10 can include a first system 300*a*, a second system 300*b*, a third system 300*c*, etc., and an nth system 300*n*. It should be understood that refuse vehicle 10 can include any number of systems, sub-systems, etc. Each system 300 can include any number of sensors (e.g., temperature sensors, fluid sensors, pressure sensors, etc.), shown as sensor 304, and any number of actuators (e.g., electric motors, hydraulic cylinders, pneumatic cylinders, internal combustion engines, electric linear actuators, etc.), shown as actuator 302.

The sensors 304 are configured to provide sensor data and/or input data (e.g., their corresponding readings) to controller 202. Controller 202 includes a processing circuit 204, a processor 206, and memory 208. Processing circuit 204 can be communicably connected to a communications interface such that processing circuit 204 and the various components thereof can send and receive data via the communications interface. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to some embodiments, memory 208 is communicably connected to processor 206 via processing circuit 204 and includes computer code for executing (e.g., by processing circuit 204 and/or processor 206) one or more processes described herein.

Controller 202 is configured to obtain the sensor or input data from systems 300 and identify if systems 300 are operating properly based on the sensor data. For example, controller 202 may compare the sensor data obtained from systems 300 to predetermined, predefined, desired, or specific values to identity if systems 300 are operating properly or to determine if refuse vehicle 10 is ready for deployment along its route. In some embodiments, controller 202 is configured to identify if systems 300 are operating properly by comparing a value of the sensor data to a desired value of the sensor data and determining if the value is within a predetermined range of the desired value. In some embodiments, controller 202 uses predetermined or acceptable ranges for values obtained from sensors 304. If the values obtained from sensors 304 are outside of the acceptable ranges, controller 202 may determine that the system 300 from which the sensor data is obtained is not operating properly. Controller 202 can operate user interface 306 to notify the technician that the system 300 should be manually inspected. If the technician determines that the system 300 is operating properly, the technician can provide a user input 310 to controller 202 through user interface 306 to clear a checklist item for the system.

User interface 306 can include a display screen 308 and a user input 310. Display screen 308 may be configured to provide display data as obtained from controller 202 to an operator, a technician, a user, etc. In some embodiments, controller 202 is configured to operate display screen 308 to notify the technician regarding which systems 300 require manual inspection. In some embodiments, controller 202 is configured to operate display screen 308 to provide checklist items and may provide an indication regarding which of the checklist items (e.g., corresponding systems 300) require manual inspection or additional inspection. After the technician has manually inspected the systems 300, the technician can provide a system clear command to the controller 202 to indicate that the system 300 has been manually inspected and that refuse vehicle 10 can be deployed along its route.

Controller 202 can be provided to generate log data regarding any of its functionality or its automated system check functionality and output the log data to database 312. In some embodiments, database 312 is a local database that is stored in memory 208 of controller 202. In some embodiments, database 312 is a remote database that is positioned remotely from controller 202 and controller 202 can provide the log data to database 312. In some embodiments, controller 202 includes a local database 312 to store log data locally in memory 208 and also provides log data to database 312 to store log data remotely.

Controller 202 may also be configured to generate control signals for system 300. For example, controller 202 can use a predetermined set of instructions, a control program, feedback data from sensors 304, etc., or any combination thereof to generate control signals for actuators 302 so that actuators 302 operate to perform the respective functions of systems 300. In some embodiments, controller 202 generates control signals for actuators 302 of refuse vehicle 10 in response to receiving a user input or a request to perform a requested function of systems 300. For example, if one of systems 300 is a grabber apparatus or a lift assembly, controller 202 can generate control signals for electric motors, electric linear actuators, pneumatic cylinders, hydraulic cylinders, etc., in response to receiving a user request to perform such functions from user interface 306 (e.g., to lift and empty a refuse bin).

In some embodiments, any of the functionality of controller 202 or processing circuitry 204 can be performed on personal computer device 218 which is communicably coupled with controller 202 or the vehicle 10 or systems, sensors, etc., of vehicle 10 thereof. In some embodiments, controller 202 is configured to provide the display data and/or instructions to the personal computer device 218. In some embodiments, personal computer device 218 is configured to perform any of the functionality of user interface 306, or vice versa. In some embodiments, controller 202 (or a cloud computing system) is configured to provide instructions to the personal computer device 218 to instruct a technician how to perform one or more system checks. For example, the controller 202 can provide unique instructions to perform a specific system check, sensor check, diagnostic process, troubleshooting process, etc., to the personal computer device 218 for display on a display screen of the personal computer device 218. The instructions can be provided to the personal computer device 218 in response to a request from the technician provided via the personal computer device 218. In some embodiments, the instructions include a checklist, step-by-step video instructions, a demonstration video, step-by-step images, etc., to instruct the technician how to perform a specific system check that is required by any of the systems 300.

Referring particularly to FIG. 3, controller 202 is shown in greater detail, according to some embodiments. Memory 208 of controller includes a checklist database 210, a check manager 212, a verification manager 216, and a log manager 214. In some embodiments, checklist database 210 is configured to provide a system checklist to check manager 212. The system checklist can include various of systems 300 that should be checked or verified to be operating properly. The system checklist can include items or different systems 300 to be checked in an order or concurrently by check manager 212. In some embodiments, the system checklist includes a corresponding value or set of values for the sensors 304 of the various systems 300. For example, the system checklist can include a desired value $A_{desired}$ or an acceptable range of values such as $A_{acceptable,min}$ and $A_{acceptable,max}$.

Check manager 212 may obtain the system checklist from checklist database 210 and any of the desired value $A_{desired}$, and/or the acceptable range of values $A_{acceptable,min}$ and $A_{acceptable,max}$. It should be understood that the system checklist can include a corresponding desired value $A_{desired}$ and/or acceptable range values $A_{acceptable,min}$ and $A_{acceptable,max}$ for each item or system 300 of the system checklist. In some embodiments, the system checklist includes a corresponding desired value $A_{desired}$ and/or acceptable range values $A_{acceptable,min}$ and $A_{acceptable,max}$ for each sensor 304 of each system 300.

Check manager 212 is configured to obtain sensor data from each of sensors 304 of the systems 300 and compare the sensor data to the corresponding desired value $A_{desired}$ and/or to the corresponding acceptable range values $A_{acceptable,min}$ and $A_{acceptable,max}$. For example, check manager 212 may obtain a sensor value $A_{sensor}$ from a corresponding sensor 304 and compare the sensor value $A_{sensor}$ to the corresponding desired value $A_{desired}$ and/or acceptable range values $A_{acceptable,min}$ and $A_{acceptable,max}$. Values of the sensor value $A_{sensor}$ being substantially equal to the desired value $A_{desired}$ or within the corresponding acceptable range values $A_{acceptable,min}$ and $A_{acceptable,max}$ may indicate that the system 300 which the sensor 304 is a component of is operating properly.

For example, check manager 212 can compare the sensor value $A_{sensor}$ to the corresponding desired value $A_{desired}$ to determine if the sensor value $A_{sensor}$ is substantially equal to the corresponding desired value $A_{desired}$. Check manager 212 can obtain sensor values $A_{sensor}$ from different sensors 304 of each system 300 and determine if each of the sensor values $A_{sensor}$ are substantially equal to their corresponding desired value $A_{desired}$. If check manager 212 determines that all of the sensors 304 are substantially equal to their corresponding desired values $A_{desired}$ for a particular system 300 (e.g., system 300*a*), check manager 212 can determine that the particular system 300 (e.g., system 300*a*) is operating properly and can output results regarding the determination to log manager 214 and/or verification manager 216. If one or more of the sensor values $A_{sensor}$ is not substantially equal to the desired value $A_{desired}$ (e.g., if the sensor value $A_{sensor}$ deviates from the desired value $A_{desired}$ by some amount), controller 202 can determine that the particular system 300 (e.g., system 300*a*) is not operating properly and can output such a determination for the particular system 300 to log manager 214 and/or verification manager 216 as the result.

Check manager 212 can similarly compare the sensor value $A_{sensor}$ for each of multiple sensors 304 to the minimum acceptable value $A_{acceptable,min}$ and the maximum acceptable value $A_{acceptable,max}$. If the sensor value $A_{sensor}$ is between the minimum acceptable value $A_{acceptable,min}$ and the maximum acceptable value $A_{acceptable,max}$, check manager 212 may identify that the sensor 304 from which the sensor value $A_{sensor}$ is obtained is giving an accurate or expected reading. Check manager 212 can compare the sensor values $A_{sensor}$ from multiple different sensors 304 of a particular system 300 (e.g., system 300*a*) to determine if system 300*a* is operating properly. If all of the sensor values $A_{sensor}$ as obtained from different sensors 304 of the particular system 300 (e.g., system 300*a*) are within their corresponding ranges (e.g., $A_{acceptable,min} \le A_{sensor} \le A_{acceptable,max}$ for each sensor 304 of the particular system 300), check manager 212 may determine that the particular system 300 is operating properly (e.g., system 300*a*) and can output an indication that the particular system 300 is operating properly to log manager 214 and/or verification manager 216 as the result. If check manager 212 determines that one or more of the sensor values $A_{sensor}$ of the particular system 300 are outside of the corresponding range (e.g., $A_{sensor} > A_{acceptable,max}$ or $A_{sensor} < A_{acceptable,min}$), check manager 212 may determine that the particular system 300 is not operating properly or requires manual inspection and can output results to log manager 214 and/or verification manager 216 regarding the particular system 300.

Check manager 212 can perform its functionality for each system 300 included on the system checklist. For example, check manager 212 may check the sensor values $A_{sensor}$ obtained from system 300*a*, system 300*b*, system 300*c*, etc., of refuse vehicle 10 to determine if each of the systems 300 are operating properly. In some embodiments, check manager 212 is configured to output a list of results indicating which of systems 300 are determined (based on the sensor values $A_{sensor}$) to be operating properly and which system 300 are determined to require manual inspection. Check manager 212 may output the results to verification manager 216 and/or log manager 214.

Log manager 214 is configured to receive the results from check manager 212 and generate log data for the particular refuse vehicle 10. The log data may include a list of system 300 that are present on refuse vehicle 10, which of the systems 300 are determined to be operating properly, which of systems 300 may be operating improperly, which of system 300 may require manual inspection, which of systems 300 have been manually inspected and manually checked as operating properly, etc., in addition to corresponding sensor values (e.g., the sensor data) of each system 300. For example, if the system 300*a* is determined to require manual inspection, the log data may include the sensor value $A_{sensor}$ that is determined to be outside of the corresponding acceptable range or that is determined to deviate significantly from the desired sensor value. Log manager 214 may provide the log data to database 312 for storage (e.g., locally in memory 208 and/or remotely). In some embodiments, the log data can be retrieved from database 312 by a user device 314 (e.g., a technician user device). User device 314 can be communicably coupled with database 312 through a network (e.g., the Internet) to facilitate retrieval of the log data from database 312. In some embodiments, database 312 is communicably coupled with controllers 202 of a fleet of refuse vehicles 10 and can include log data from each refuse vehicle 10 of the fleet. In this way, a technician may track, view, or otherwise analyze fleet data by retrieving the log data from database 312.

Verification manager 216 is configured to receive the results from check manager 212 and generate inspection prompts or a checklist for presentation to an operator or technician on user interface 306. For example, verification manager 216 may generate a checklist that is a subset of the system checklist based on which of system 300 may require manual inspection. If check manager 212 determines that system 300*a* and system 300*c* require manual inspection to verify that these systems are operating properly, but that system 300*b* is operating properly, verification manager 216 can generate inspection prompts or a checklist that includes system 300*a* and system 300*c*. Verification manager 216 can then provide the checklist or the inspection prompts for system 300*a* and system 300*c* to any of display screen 308, a cloud computing system 316, a maintenance system 318 (e.g., a customer's maintenance system), or a virtual refuse truck 320. The virtual refuse truck 320 can be included in a cloud computing system (e.g., cloud computing system 316) and can be configured to perform any of the functionality of the systems and methods described in greater detail with reference to U.S. application Ser. No. 16/789,962, filed Feb. 13, 2020, the entire disclosure of which is incorporated by reference herein. Display screen 308 may operate to display the inspection prompts or the checklist so that a technician or operator or user is notified to manually inspect certain systems 300.

Verification manager 216 is also configured to receive user input 310 indicating manual inspection results or whether a system should be cleared from the checklist as provided by display screen 308. For example, after the technician manually inspects the potentially faulty systems 300, the technician may provide a result of the manual inspection to verification manager 216 through the user interface 306. The result of the manual inspection may be either an indication that the system is operating properly, or that the system requires maintenance. For example, if the checklist includes system 300*a* and system 300*c*, the technician may view the checklist on display screen 308 and then perform manual inspections of system 300*a* and system 300*c*. If the technician determines that system 300*a* and system 300*c* are operating properly, the technician can provide a user input to verification manager 216 (e.g., via the user interface 306) so that system 300*a* and system 300*c* are marked as manually verified to be operating properly. If the technician determines that, for example, system 300*a* is operating properly but that system 300*c* is not operating properly, the technician can provide a user input to verification manager 216 via user interface 306 indicating that system 300*a* should be marked as operating properly, but that system 300*c* requires additional maintenance. If the technician performs maintenance on system 300*c*, the technician can provide a user input to verification manager 216 indicating that maintenance has been performed on system 300*c* and that system 300*c* is now operating properly.

In some embodiments, log manager 214 is also configured to receive any of the system clears, manual inspection results, or other user inputs from the technician indicating the results of the manual inspection. Log manager 214 can record any of the user inputs provided by the technician and include such user inputs for the corresponding system 300 in the log data that is generated and provided to database 312. Log manager 214 can also provide any the log data to any of the virtual refuse truck 320, the maintenance system 318, or the cloud computing system 316. In some embodiments, log manager 214 provides the log data to the database 312 and/or any of the virtual refuse truck 320, the maintenance system 318, or the cloud computing system 316 through a telematics system 322 of the vehicle 10. Verification manager 216 can similarly be configured to provide any of the inspection prompts or the checklist(s) to the virtual refuse truck 320, the maintenance system 318, or the cloud computing system 316 via telematics system 322 of the vehicle 10. Telematics system 322 can include any wireless transceiver, cellular dongle, radio transceivers, etc., for performing wireless communication. In some embodiments, log manager 214 and verification manager 216 are configured to operate in real-time so that display screen 308 changes a status of particular systems 300 or provides an indication that particular systems 300 have been manually checked and verified to be operating properly. For example, verification manager 216 may present a list of the systems 300 of refuse vehicle 10 and color-code systems 300 based on the results of check manager 212. Systems 300 that are automatically determined to be operating properly may be provided on the list (e.g., as provided by display screen 308) as a first color (e.g., green) while systems that are determined to require manual inspection may be provided with a second color (e.g., red or yellow). In some embodiments, verification manager 216 is configured to change colors of systems 300 on the list provided by display screen 308 in response to receiving the user input 310 that indicates the results of the manual inspection. For example, if system 300*c* is initially determined by check manager 212 to require manual inspection or maintenance, display screen 308 can provide a notification (e.g., in a red or yellow color) for system 300*c* to prompt the technician to manually inspect system 300*c*. After the technician has performed maintenance on system 300*c* (if required) or determined that system 300*c* is operating properly, the technician may provide manual inspection results to verification manager 216 as a user input (e.g., via user interface 306) and verification manager 216 may change a color of the indication of system 300*c* on display screen 308 (e.g., from red or yellow to green or blue).

In some embodiments, verification manager 216 is configured to prompt check manager 212 to re-perform its functionality to determine if systems 300 that are initially identified as faulty or requiring manual inspection or maintenance are operating properly. For example, after the technician marks potentially faulty systems 300 as operating properly (e.g., by providing a user input to verification manager 216 and/or log manager 214), check manager 212 may re-perform its functionality by obtaining sensor data from the potentially faulty systems 300 and re-assessing whether or not systems 300 are operating properly. In some embodiments, check manager 212 re-performs its functionality for all systems 300. In some embodiments, check manager 212 re-performs its functionality only for systems 300 that were previously identified as requiring manual inspection.

Controller 202 can prevent or restrict operation of systems 300 that are not identified by check manager 212 as operating properly. For example, if check manager 212 determines that system 300*a* is not operating properly or requires manual inspection, controller 202 can prevent, restrict, or otherwise limit operation of actuator 302*a* of system 300*a*. In some embodiments, controller 202 prevents, limits, or restricts operation of potentially faulty systems 300 until check manager 212 determines that the systems 300 are operating properly or until receiving an override command (e.g., from a technician or operator via user interface 306). Override commands may be provided to log manager 214 and included in the log data stored in database 312. In some embodiments, check manager 212 re-performs its functionality to check systems 300 in response to receiving a request or a command from the technician (e.g., via user interface 306) to re-perform its functionality and re-check systems 300.

Advantageously, automated check system 200 facilitates automatically checking systems 300 of refuse vehicle 10 to identify which systems 300 require additional inspection. Automated check system 200 can also facilitate automatically identifying faulty systems 300 and notifying the technician to perform maintenance on faulty systems 300. Automated check system 200 may use sensor data from sensors 304 of systems 300 of refuse vehicle 10. Sensors 304 may be pre-existing sensors, or may be installed for use with controller 202.

Process

Figure 4:
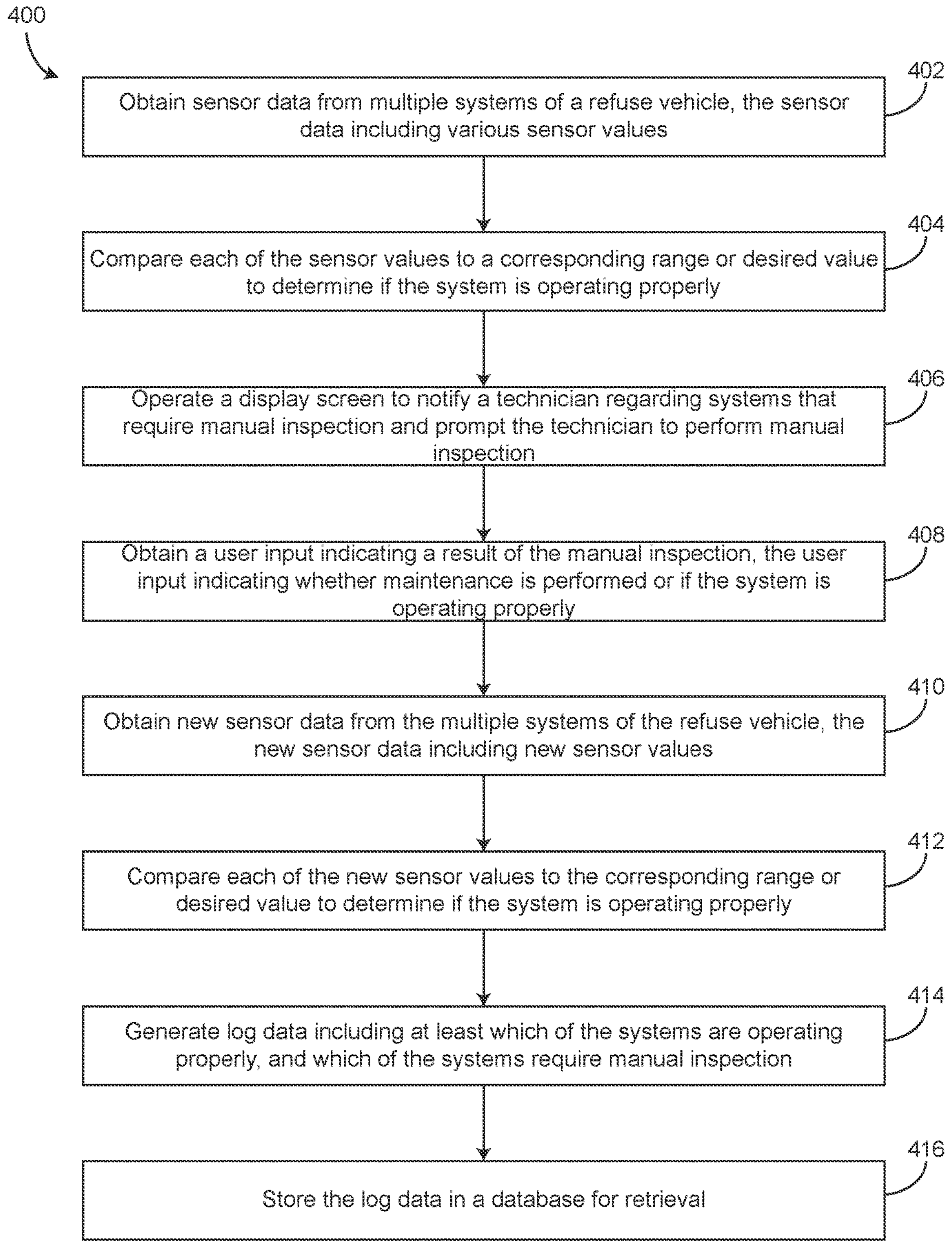
FIG. 4 is a flow diagram of a process for performing an automated system check of a refuse vehicle, according to an exemplary embodiment.

Referring particularly to FIG. 4, a process 400 for performing an automatic check or diagnostics of various systems of a refuse vehicle is shown, according to some embodiments. Process 400 can be performed by automated check system 200. Process 400 can include steps 402-416.

Process 400 includes obtaining sensor data from multiple systems of a refuse vehicle, the sensor data including various sensor values (step 402), according to some embodiments. Step 402 may be performed by check manager 212 of controller 202 and sensors 304 of systems 300. In some embodiments, controller 202 is communicably (e.g., wiredly and/or wirelessly) coupled with various sensors of the refuse vehicle to facilitate obtaining the sensor data. Each system may include multiple sensors, which each provide a sensor value.

Process 400 includes comparing each of the sensor values to a corresponding range or a desired value to determine if the system of the sensor values is operating properly (step 404), according to some embodiments. Step 404 can be performed by check manager 212. In some embodiments, check manager 212 uses a system checklist obtained from a database (e.g., checklist database 210) that includes the corresponding range or a corresponding desired value for each of the sensors of the systems. Step 404 can include determining that a system is operating properly if the sensor values obtained from the system are within the corresponding range. If one or more of the sensor values obtained from the system are outside the corresponding range (e.g., above a maximum threshold value or below a minimum threshold value), process 400 can include determining that the system may be operating improperly or inoperational.

Process 400 includes operating a display screen to notify a technician regarding systems that require manual inspection and prompt the technician to perform manual inspection (step 406), according to some embodiments. Step 406 can be performed by verification manager 216 and display screen 308 based on results of check manager 212 (e.g., based on the results of step 404). Step 406 can include operating the display screen to provide a checklist of systems that should be manually inspected based on the results of step 404.

Process 400 includes obtaining a user input indicating a result of the manual inspection, the user input indicating whether maintenance is performed or if the system is operating properly (step 408), according to some embodiments. In some embodiments, step 408 is performed by log manager 214 and/or verification manager 216.

Process 400 includes obtaining new sensor data from the multiple systems of the refuse vehicle, the new sensor data including new sensor values (step 410), according to some embodiments. In some embodiments, the new sensor data is obtained in response to receiving a user input or a request (e.g., from a technician) to re-perform step 402. In some embodiments, step 410 is the same as or similar to step 402 but is performed after receiving a user input from a technician to re-check the various systems of the refuse vehicle (e.g., after the technician has performed the maintenance).

Process 400 includes comparing each of the new sensor values to the corresponding range or the desired value to determine if the system is operating properly (step 412), according to some embodiments. In some embodiments, step 412 is performed by check manager 212. Step 412 can be the same as or similar to step 404.

Process 400 includes generating log data including at least which of the systems are operating properly and which of the systems require manual inspection (step 414), according to some embodiments. Step 414 can be performed by log manager 214. The log data may include a list of the various systems that are checked by performing process 400 and can include any of the sensor data obtained during performing process 400.

Process 400 includes storing the log data in a database for retrieval (step 416), according to some embodiments. In some embodiments, step 416 is performed by log manager 214 and database 312. Step 416 can include providing the log data to database 312 (e.g., a remote database or in local memory of a controller that performs process 400). In some embodiments, step 416 includes aggregating log data across a fleet of refuse vehicles. The log data can be retrieved and used for fleet analysis.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media.

Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A refuse vehicle comprising:

a plurality of systems including a compaction apparatus and a lift apparatus, the lift apparatus configured to raise a refuse receptacle and empty refuse of the refuse receptacle into a hopper, and the compaction apparatus configured to compact the refuse, each system comprising a sensor;

an automated check system comprising processing circuitry configured to:

obtain sensor data from the sensor of each of the plurality of systems;

determine which of the plurality of systems are operating properly based on the sensor data and which of the plurality of systems require manual inspection based on the sensor data;

operate a display screen to provide a checklist indicating which of the plurality of systems are operating properly and which of the plurality of systems require manual inspection to prompt a technician to manually inspect one or more of the plurality of systems that require manual inspection; and limit deployment of the refuse vehicle by restricting activation of the plurality of systems that require manual inspection until the technician has manually inspected the one or more of the plurality of systems that require manual inspection and provided an input that the one or more of the plurality of systems that require manual inspection have been manually inspected and are operating properly.

2. The refuse vehicle of claim 1, wherein the sensor data includes a sensor value, wherein the processing circuitry of the automated check system is configured to:

compare the sensor value to a corresponding range, and based on the comparison between the sensor value and the corresponding range, determine which of each of the plurality of systems require manual inspection.

3. The refuse vehicle of claim 2, wherein the processing circuitry is configured to determine that one or more of the plurality of systems are operating properly in response to the sensor value being within the corresponding range.

4. The refuse vehicle of claim 1, wherein the processing circuitry is further configured to:

receive a user input from the technician to re-check the plurality of systems;

obtain new sensor data from the sensor of each of the plurality of systems; and determine which of the plurality of systems still require manual inspection based on the new sensor data.

5. The refuse vehicle of claim 1, wherein the processing circuitry is configured to generate log data indicating the sensor data and which of the plurality of systems are determined to require manual inspection.

6. The refuse vehicle of claim 1, wherein the plurality of systems further comprise at least one of an engine system, a transmission system, a grabber apparatus, an air system, a tire pressure system, a pneumatic system, a fluid system, or an electrical system of the refuse vehicle.

7. The refuse vehicle of claim 1, further comprising a telematics system, wherein the automated check system is configured to transmit log data to a virtual refuse truck or a cloud computing system using the telematics system.

8. The refuse vehicle of claim 1, wherein the processing circuitry is configured to limit activation of the one or more of the plurality of systems that require manual inspection.

9. The refuse vehicle of claim 1, wherein the processing circuitry is configured to operate the display screen to provide visual instructions to the technician for performing a manual inspection of the one or more of the plurality of systems that are determined to require manual inspection.

10. A check system for a refuse vehicle comprising:

processing circuitry configured to:

obtain sensor data from a sensor of each of a plurality of systems of the refuse vehicle, the plurality of systems including a compaction apparatus and a lift apparatus, the lift apparatus configured to raise a refuse receptacle and empty refuse of the refuse receptacle into a hopper, and the compaction apparatus configured to compact the refuse;

determine which of the plurality of systems are operating properly based on the sensor data and which of the plurality of systems require manual inspection based on the sensor data;

operate a display screen to provide a checklist indicating which of the plurality of systems are operating properly and which of the plurality of systems require manual inspection to prompt a technician to manually inspect one or more of the plurality of systems that require manual inspection; and limit deployment of the refuse vehicle by restricting activation of the plurality of systems that require manual inspection until the technician has manually inspected the one or more of the plurality of systems that require manual inspection and provided an input that the one or more of the plurality of systems that require manual inspection have been manually inspected and are operating properly.

11. The check system of claim 10, wherein the sensor data includes a sensor value, wherein the processing circuitry of the check system is configured to:

compare the sensor value to a corresponding range, and based on the comparison between the sensor value and the corresponding range, determine which of each of the plurality of systems require manual inspection.

12. The check system of claim 11, wherein the processing circuitry is configured to determine that one or more of the plurality of systems are operating properly in response to the sensor value being within the corresponding range.

13. The check system of claim 10, wherein the processing circuitry is further configured to:

receive a user input from the technician to re-check the plurality of systems;

obtain new sensor data from the sensor of each of the plurality of systems; and determine which of the plurality of systems still require manual inspection based on the new sensor data.

14. The check system of claim 10, wherein the processing circuitry is implemented on a personal computer device communicably coupled with a system of the refuse vehicle.

15. The check system of claim 10, wherein the processing circuitry is configured to limit activation of the one or more of the plurality of systems that require manual inspection.

16. The check system of claim 10, wherein the processing circuitry is configured to operate the display screen to provide visual instructions to the technician for performing a manual inspection of the one or more of the plurality of systems that are determined to require manual inspection.

17. A method for determining if a refuse vehicle is ready for deployment, the method comprising:

obtaining sensor data from a sensor of each of a plurality of systems of the refuse vehicle, the plurality of systems including a compaction apparatus and a lift apparatus, the lift apparatus configured to raise a refuse receptacle and empty refuse of the refuse receptacle into a hopper, and the compaction apparatus configured to compact the refuse;

determining which of the plurality of systems are operating properly based on the sensor data and which of the plurality of systems require manual inspection based on the sensor data;

operating a display screen to provide a checklist indicating which of the plurality of systems are operating properly and which of the plurality of systems require manual inspection to prompt a technician to manually inspect one or more of the plurality of systems that are determined to require manual inspection; and limiting deployment of the refuse vehicle by restricting activation of the plurality of systems that require manual inspection until the technician has manually inspected the one or more of the plurality of systems that require manual inspection and provided an input that the one or more of the plurality of systems that require manual inspection have been manually inspected and are operating properly.

18. The method of claim 17, further comprising:

obtaining an input from the technician indicating a result of the manual inspection of one or more of the plurality of systems of the refuse vehicle that are determined to require manual inspection;

obtaining new sensor data from the sensor of each of the plurality of systems of the refuse vehicle; and determining if any of the plurality of systems are not operating properly based on the new sensor data.

19. The method of claim 17, further comprising:

providing visual instructions to the technician for performing a manual inspection of the one or more of the plurality of systems that are determined to require manual inspection on the display screen.

20. The method of claim 17, further comprising limiting activation of the one or more of the plurality of systems that require manual inspection.

* * * * *